(12) United States Patent
Locatelli et al.

(10) Patent No.: US 10,790,663 B2
(45) Date of Patent: *Sep. 29, 2020

(54) COMPUTER-IMPLEMENTED METHOD FOR CONFIGURING A LOAD SHEDDING CONTROLLER

(71) Applicant: ABB S.p.A., Milan (IT)

(72) Inventors: Emilio Battista Locatelli, San Pellegrino Terme (IT); Simone Micheli, Zogno (IT)

(73) Assignee: ABB S.p.A., Milan (IT)

( * ) Notice: Subject to any disclaimer, the term of this patent is extended or adjusted under 35 U.S.C. 154(b) by 107 days.

This patent is subject to a terminal disclaimer.

(21) Appl. No.: 15/945,376

(22) Filed: Apr. 4, 2018

(65) Prior Publication Data

US 2018/0287384 A1 Oct. 4, 2018

(30) Foreign Application Priority Data

Apr. 4, 2017 (EP) ..................................... 17164717

(51) Int. Cl.
*H02J 13/00* (2006.01)
*H02J 3/14* (2006.01)
(Continued)

(52) U.S. Cl.
CPC ................. *H02J 3/14* (2013.01); *G05B 15/02* (2013.01); *G06F 3/04847* (2013.01);
(Continued)

(58) Field of Classification Search
CPC ......... G05B 15/02; G06Q 50/06; H02J 13/00; H02J 3/14
(Continued)

(56) References Cited

U.S. PATENT DOCUMENTS

2007/0044071 A1    2/2007  Hayles
2008/0167756 A1*   7/2008  Golden .................. G05B 15/02
                                                    700/297
(Continued)

FOREIGN PATENT DOCUMENTS

EP          1602531 A2      12/2005
EP          3276770 A1       1/2018

OTHER PUBLICATIONS

European Patent Office, Extended Search Report issued in corresponding Application No. 17164717.5, dated Oct. 2, 2017, 7 pp.

*Primary Examiner* — Md Azad
(74) *Attorney, Agent, or Firm* — J. Bruce Schelkopf; Taft Stettinius & Hollister LLP

(57) ABSTRACT

Systems, methods, techniques and apparatuses for configuring load shed controllers are disclosed. One exemplary embodiment is a method comprising providing a graphic user interface on a computer display; providing first, second, third, and fourth graphic resources on said graphic user interface; checking whether said load shedding controller meets minimum operating requirements to operate; if said load shedding controller meets said minimum operating requirements, transmitting configuration information including at least first and second configuration values to said load shedding controller; and controlling, with the load shedding controller, the one or more of the electric loads based on the first and second configuration values. The third graphic resources assist a user in providing first configuration values to configure grid operating parameters. The fourth graphic resources assist a user in providing second configuration values to configure load operating parameters.

22 Claims, 9 Drawing Sheets

(51) Int. Cl.
    *G05B 15/02* (2006.01)
    *G06F 3/0484* (2013.01)
    *G06Q 50/06* (2012.01)
    *H02J 3/38* (2006.01)
    *H02H 3/033* (2006.01)

(52) U.S. Cl.
    CPC .............. *G06Q 50/06* (2013.01); *H02J 3/381* (2013.01); *H02J 13/00001* (2020.01); *H02H 3/033* (2013.01); *H02J 13/0062* (2013.01); *H02J 13/0075* (2013.01); *H02J 2203/20* (2020.01); *Y02B 70/3225* (2013.01); *Y04S 20/222* (2013.01)

(58) Field of Classification Search
    USPC ......................................................... 700/795
    See application file for complete search history.

(56) References Cited

U.S. PATENT DOCUMENTS

| | | | |
|---|---|---|---|
| 2008/0172312 A1* | 7/2008 | Synesiou | G06Q 10/00 705/34 |
| 2009/0315400 A1 | 12/2009 | Howe et al. | |
| 2010/0138066 A1* | 6/2010 | Kong | G06Q 30/018 700/295 |
| 2012/0109388 A1* | 5/2012 | Haugh | H02J 3/14 700/286 |
| 2014/0351010 A1 | 11/2014 | Kong | |
| 2016/0043547 A1* | 2/2016 | Patel | H02J 3/005 307/19 |
| 2016/0048277 A1 | 2/2016 | Scott et al. | |
| 2017/0033560 A1 | 2/2017 | Berdner | |
| 2017/0237289 A1* | 8/2017 | Thompson | H02J 3/00 700/296 |

\* cited by examiner

COMPUTER-IMPLEMENTED METHOD FOR CONFIGURING A LOAD SHEDDING CONTROLLER

The present invention relates to the field of electric power distribution grids.

More particularly, the present invention relates to a computer-implemented method to configure a load shedding controller adapted to control the operation of a micro-grid when this latter operates disconnected from the main grid.

As is known, in the field of electric power distribution networks, a micro-grid is commonly intended as an electric power distribution system arranged and confined in a limited zone.

In addition to a variety of electric loads, a micro-grid normally includes a number of electric power generators, e.g. solar panel plants, wind turbine plants, combined heat and power systems, marine energy generation systems, geothermal or biomass energy generation systems, solar generation, diesel generation, fuel cells, and the like.

In order to provide stable electric power to critical electric loads, a micro-grid may include also a variety of energy storage units, e.g. as capacitor banks, batteries and the like.

Normally, a micro-grid is electrically connected to a main grid, such as an electric power utility grid. In this case, a micro-grid is commonly referred to as operating in a "grid connected mode". However, in response to system needs, abnormal conditions (e.g. faults or power outages in the main grid) or user's decision, a micro-grid may be electrically disconnected (e.g. by means of a suitably arranged circuit breaker) from the main grid and operate in a so-called "islanded mode". As is known, when a micro-grid operates in an islanded mode, its operating frequency and voltage may be subject to relevant transients that may rapidly lead (e.g. tens of ms) to black-out phenomena or malfunctions of the electric loads.

In addition, when a micro-grid is disconnected from the main grid, the electric power provided by electric generators installed in the micro-grid may not be sufficient to supply all connected electrical loads.

For the above reasons, in many solutions of the state of the art, dedicated load shedding controllers (e.g. digital relays) adapted to control the operation of micro-grids operating in an islanded mode are installed.

Typically, these controllers are capable of executing suitable load shedding procedures to electrically connect or disconnect in a selective manner the electric loads of a micro-grid, when this latter operates in an islanded mode.

As is known, the operation of a load shedding controller depends on a set of operating parameters (e.g. frequency threshold values, communication parameters, grid parameters, and the like) stored and duly processed during the execution of a load shedding procedure to control the operation of a micro-grid.

Such operating parameters need to be properly set-up (or "configured" according to a widely used terminology) during the operating life of the load shedding controller, e.g. particularly when this latter is installed on the field or during maintenance interventions.

Traditional solutions for configuring operating parameters of load shedding controllers normally require a time-consuming cabling activity to acquire their inputs and outputs and an intensive programming activity to model and set-up their functionalities.

All these activities normally entail the intervention of specialized personnel with a remarkable increase of the overall costs.

The main aim of the present invention is to provide a method for setting-up the operating parameters of a load shedding controller, which allows solving or mitigating the technical problems evidenced above.

Within this aim, an object of the present invention is to provide a method to carry out a quick and efficient configuration of a load shedding controller.

A further object of the present invention is to provide a method that can be easily carried out even by non-specialized operators.

A further object of the present invention is to provide a method that can be easily computer-implemented without the adoption of expensive processing resources.

These aim and objects are achieved by a method for configuring a load shedding controller adapted to control a micro-grid, according to the following claim 1 and the related dependent claims.

In a general definition, the method, according to the invention, comprises the following steps:

providing a graphic user interface on a computer display, said graphic user interface including graphic resources activatable by a user;

providing first graphic resources on said graphic user interface to assist a user in selecting a load shedding procedure to be executed by said load shedding controller in response to the disconnection of said micro-grid from said main grid;

providing second graphic resources on said graphic user interface to assist a user in listing the electric loads included in said micro-grid;

providing third graphic resources on said graphic user interface to assist a user in providing first configuration values to configure grid operating parameters of the load shedding controller, which are processed during the execution of the selected load shedding procedure by said load shedding controller;

providing fourth graphic resources on said graphic user interface to assist a user in providing second configuration values to configure load operating parameters of the load shedding controller, which are processed during the execution of the selected load shedding procedure by said load shedding controller;

checking whether said load shedding controller meets minimum operating requirements;

if said load shedding controller meets said minimum operating requirements, transmitting configuration information including said first and second configuration values to said load shedding controller.

According to an aspect of the invention, second graphic resources comprise second and third graphic objects to define the electric loads of said micro-grid, said second graphic objects being activatable to upload said third graphic objects on said graphic user interface, each third graphic object identifying a corresponding electric load of said micro-grid and being activatable to upload further graphic objects configured to assist a user in providing configuration values to set-up said load operating parameters.

According to an aspect of the invention, said third graphic resources comprise fourth and fifth graphic objects to set-up first grid operating parameters related to operation of said micro-grid, said fourth graphic objects being activatable to upload said fifth graphic objects on said graphic user interface, said fifth graphic objects being configured to assist a user in providing first configuration values to set-up said first grid operating parameters.

According to an aspect of the invention, said third graphic resources comprise sixth and seventh graphic objects to set-up second grid operating parameters related to operation of at least an energy production plant included in said micro-grid, said sixth graphic objects being activatable to upload said seventh graphic objects on said graphic user interface, said seventh graphic objects being configured to assist a user in providing first configuration values to set-up said second grid operating parameters.

According to an aspect of the invention, said third graphic resources comprise eighth and ninth graphic objects to set-up third grid operating parameters related to operation of at least an emergency electric power generator included in said micro-grid, said eighth graphic objects being activatable to upload said ninth graphic objects on said graphic user interface, said ninth graphic objects being configured to assist a user in providing first configuration values to set-up said third grid operating parameters.

According to an aspect of the invention, said fourth graphic resources comprise tenth graphic objects configured to assist a user in providing second configuration values to set-up said load operating parameters for each electric load.

Preferably, said tenth graphic objects are uploaded on said graphic user interface upon activation of said third graphic objects identifying said electric loads.

According to an aspect of the invention, said step of transmitting said configuration information to load shedding controller comprises the following steps:
- receiving coded information to enable transmission of said configuration information to said load shedding controller;
- checking said coded information;
- transmitting said configuration information to load shedding controller if said coded information is correct.

Preferably, said configuration information is transmitted to said load shedding controller via an Internet or LAN or WAN communication line.

In a further aspect, the present invention relates to a computer program, according to the following claim 10.

In yet a further aspect, the present invention relates to a computerised device, according to the following claim 11.

Preferably, said computerised device is configured to communicate with said load shedding controller through an Internet or LAN or WAN communication line.

Further characteristics and advantages of the present invention will emerge more clearly from the description of preferred, but not exclusive embodiments, of which non-limiting examples are shown in the attached drawings, in which.

Figure 1:
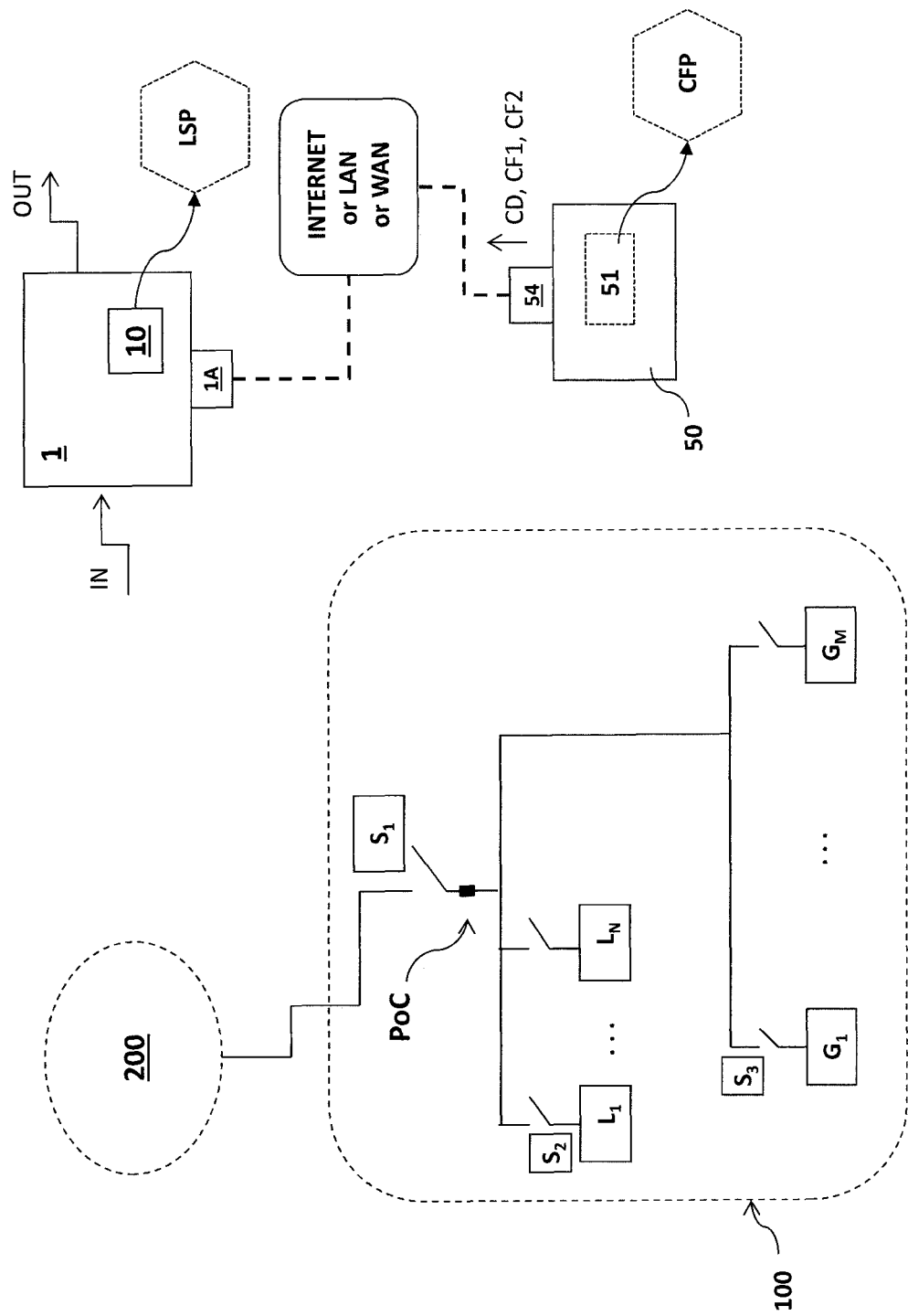
FIG. 1 is a schematic view showing a micro-grid and a load-shedding controller for controlling said micro-grid.

With reference to the above-mentioned figures, the present invention refers to a configuration procedure method (CFP) for configuring a load shedding controller 1 capable of controlling the operation of a low or medium voltage electric power distribution micro-grid 100.

Within the framework of the present invention the term "low voltage" relates to operational voltages up to 1.2 kV AC and 1.5 kV DC whereas the term "medium voltage" relates to operational voltages higher than 1.2 kV AC and 1.5 kV DC up to several tens of kV, e.g. up to 72 kV AC and 100 kV DC.

The micro-grid 100 may be an electric power distribution network for industrial, commercial and residential buildings or plants. As an example, it may have an average power consumption comprised in the range between 0.05 MW and 10 MW.

The micro-grid 100 comprises an electric coupling node PoC (Point of Coupling), at which it is electrically connectable with or disconnectable from an electric power distribution main grid 200. This latter may be an extended electric power distribution network, such as for example electric power utility grid.

Normally, the micro-grid 100 is electrically connected with the main grid 200 at the electric coupling node PoC. However, in some circumstances (e.g. in case of power outages or faults), the micro-grid 100 may electrically disconnect from the main grid 200 at the electric coupling node PoC.

The micro-grid 100 preferably comprises at least a first switching device $S_1$ (e.g. a circuit breaker), the operation of which can be controlled through suitable control signals.

The switching device S1 may be controlled by the load shedding controller 1 or by a control device different from the load shedding controller 1.

When the switching device $S_1$ is in a closed (ON) state, the micro-grid 100 is electrically connected to the main grid 200 and operates in a grid-connected mode.

When the switching device $S_1$ is in an open (OFF) state, the micro-grid 100 is electrically disconnected from the main grid 200 at the electric coupling node POC and may operate in an islanded mode.

The micro-grid 100 comprises one or more electric loads $L_1, \ldots, L_N$, each consuming a corresponding amount of electric power provided by the micro-grid 100.

The electric loads $L_1, \ldots, L_N$ may be of any type, according to the needs.

In general, an electric load $L_1, \ldots, L_N$ may be any device adapted to consume an amount of electric power in operation.

The electric loads $L_1, \ldots, L_N$ may be arranged on one or more grid branches, according to the needs. In principle, the electric loads $L_1, \ldots, L_N$ may be electrically connected with or disconnected from the micro-grid 100, according to the needs.

Conveniently, the micro-grid 100 comprises one or more second switching devices $S_2$ for electrically disconnecting or connecting one or more electric loads or one or more grid branches from or with the remaining portions of the micro-grid.

The second switching devices $S_2$ may include, for example, circuit breakers, contactors, I-O interfaces, switches, switch-disconnectors, communication interfaces or other similar devices.

The operation of the switching devices $S_2$ can be controlled in a known manner by the load shedding controller 1 through suitable control signals.

The micro-grid 100 comprises one or more electric power generators $G_1, \ldots, G_M$, which may be of any type and arranged according to the needs.

As an example, they may comprise solar panel plants, wind turbine plants, combined heat and power systems, marine energy generation systems, solar generation, diesel generation, geothermal or biomass energy generation systems, fuel cells, capacitor banks, batteries and the like.

Preferably, the electric power generators $G_1, \ldots, G_M$ comprise at least a solar power plant. Preferably, the electric power generators $G_1, \ldots, G_M$ comprises at least an emergency electric power generator adapted to provide electric power to the micro-grid 100, only when this latter is electrically disconnected from the main grid 200.

Advantageously, the micro-grid 100 comprises one or more third switching devices $S_3$ for electrically disconnecting or connecting said electric power generators (and possibly said energy storage units) from or with the remaining portions of the micro-grid.

The third switching devices $S_3$ may include, for example, circuit breakers, contactors, switch disconnectors or other similar devices.

The operation of the switching devices $S_3$ can be controlled in a known manner by the load shedding controller 1 through suitable control signals.

The load shedding controller 1 may be a computerised device installed on the field or in a remote location with respect to the electric power distribution micro-grid 100.

As an example, the load shedding controller 1 may be a control and protection unit installed on board a switching device or a digital relay for electric power distribution grids.

The load shedding controller 1 comprises one or more inputs IN, at which it can receive input signals (e.g. data signals) from one or more devices included in the micro-grid 100, e.g. the switching devices $S_1$, $S_2$, $S_3$, the electric loads $L_1, \ldots, L_N$ or generators $G_1, \ldots, G_M$ or one or more sensing devices installed on the field.

The load shedding controller 1 comprises one or more outputs OUT, at which it can provide output signals (e.g. control signals) for one or more devices included in the micro-grid 100, e.g. to the switching devices $S_1$, $S_2$, $S_3$.

Conveniently, the load shedding controller 1 comprises one or more load shed controller communication ports 1A for communication with one or more remote computerized devices through an Internet or LAN or WAN communication line. As an example, the communication ports 1A may be TCP or UDP ports suitable for an Internet protocol suite.

Information may be transmitted through a suitable communication cable (e.g. of the ETHERNET type) or a suitable antenna arrangement (e.g. of the Wi-Fi or Bluetooth type).

As mentioned above, the load shedding controller 1 is adapted to control the operation of the micro-grid 100.

To this aim, the load shedding controller 1 conveniently comprises computerised resources 10 (e.g. one or more microprocessors) configured to execute suitable software instructions stored or storable in a storage medium, e.g. in a memory.

Conveniently, the load shedding controller 1 is adapted to execute one or more load shedding procedures LSP to electrically connect or disconnect in a selective manner one or more disconnectable electric loads $L_1, \ldots, L_N$ with or from the micro-grid 100, when said micro-grid is disconnected from the main grid 200, more precisely in response to an electric disconnection of the micro-grid 100 from the main grid 200.

Said one or more load shedding procedures LSP may be of known type and will not here furthermore described for the sake of brevity.

Examples of load shedding procedures or procedures, which may be carried out by the load shedding controller 1, are disclosed in patent documents EP16181163 and EP1602531.

Obviously, in order to implement said one or more load shedding procedures LSP, the computerised resources 10 of the load shedding controller 1 execute suitable corresponding sets of software instructions stored or storable in a storage medium.

As mentioned above, the method CFP, according to the invention, is a method for configuring the load shedding controller 1.

In the framework of the present invention, "configuring" the load shedding controller 1 consists, in general, in setting-up some operating parameters used by said load shedding controller to exploit its functionalities, in particular to carry out the above-mentioned load shedding procedures LSP.

In general, said operating parameters may be set-up by providing the load shedding controller 1 with suitable numeric or logic values (configuration values) that can be stored and processed by the load shedding controller itself.

As it will apparently emerge from the following, the method CFP, according to the invention, is particularly suitable for being implemented by a computerised device 50 and, for the sake of clarity, it will be described in the following with specific reference to this kind of implementation.

In general, the computerised device 50 may be of any known type, such a desktop computer, a laptop computer, a tablet, a smartphone or the like.

The computerised device 50 is provided with processing resources 51 (e.g. including one or more microprocessors) capable of executing software instructions stored or storable in a storage medium (e.g. a memory of said load shedding controller) to implement the configuration method CFP, according to the invention.

The computerised device 50 comprises or it is operatively associated to a display 52 that is driven by the processing resources 51.

Conveniently, the computerised device 50 has Internet or LAN or WAN communication capabilities.

To this aim, it is equipped with one or more computerized device communication ports 54 (e.g. ETHERNET or Bluetooth or Wi-Fi ports) for communication with remote electronic devices through the Internet or a LAN or a WAN. As an example, the communication ports 54 may be TCP or UDP ports suitable for an Internet protocol suite.

Information may be transmitted through a suitable communication cable (e.g. of the ETHERNET type) or a suitable antenna arrangement (e.g. of the Wi-Fi or Bluetooth type).

Conveniently, the computerised device 50 is capable of communicating with the load shedding controller 1 via an Internet or LAN or WAN communication line.

Figure 2:
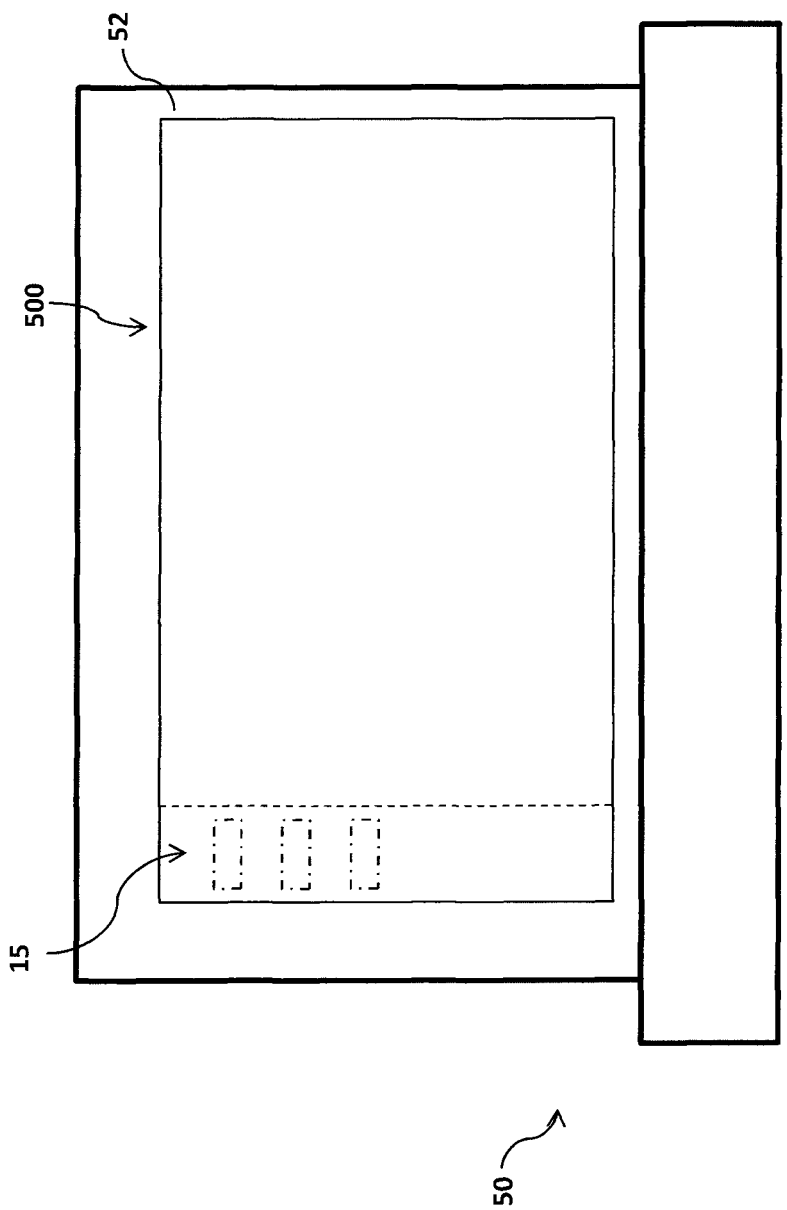
FIG. 2 is a schematic view showing a computerised device implementing the method of the invention.

According to the invention, the method 100 comprises a step in which the computerised device 50 provides a graphic user interface 500 on the computer display 52 (FIG. 2).

The graphic user interface (GUI) 500 is a visual graphic environment comprising visual graphic resources 11, 12, 13, 14, 15 (e.g. graphic icons, graphic windows, graphic cursors, visual indicators, visual menus, and the like) to assist a user in configuring the load shedding controller 1 by means of the computerised device 50.

In general, the graphic resources 11, 12, 13, 14, 15 are made available to assist a user providing in input to the computerised device 50 specific commands to execute corresponding actions or configuration information to configure the load shedding controller 1.

Conveniently, the graphic resources 11, 12, 13, 14, 15 are activatable in accordance to known activation modes adopted in computerised devices, e.g. by clicking on said graphic resources through a mouse pointer (e.g. when the display 52 is a computer monitor or a lap-top display) or by touching corresponding interactive regions of the display 52 (e.g. when the display 52 is a touch-screen display).

Configuration information can be provided in input to the computerised device 50 by a user in accordance to known input modes adopted in computerised devices, e.g. by typing or activating dedicated graphic objects (graphic cursors, graphic icons, and the like).

Preferably, the GUI 500 comprises one or more configuration pages, at which the graphic resources 11, 12, 13, 14, 15 are made available. Each configuration page may include one or more configuration sections where the above-mentioned graphic resources are displayed.

Preferably, the GUI 500 comprises auxiliary graphic resources 15 (e.g. graphic buttons) on each configuration page to allow a user to navigate through different configuration pages or to save or to upload said configuration pages on or from a storage memory of the computerised device 50.

According to the invention, the method CFP comprises a step of providing first graphic resources 11 on the GUI 500 to assist a user in selecting a load shedding procedure LSP to be executed by the load shedding controller 1 during the operating life of the micro-grid 100, more particularly when the micro-grid 100 is disconnected from the main grid 200.

Figure 3:
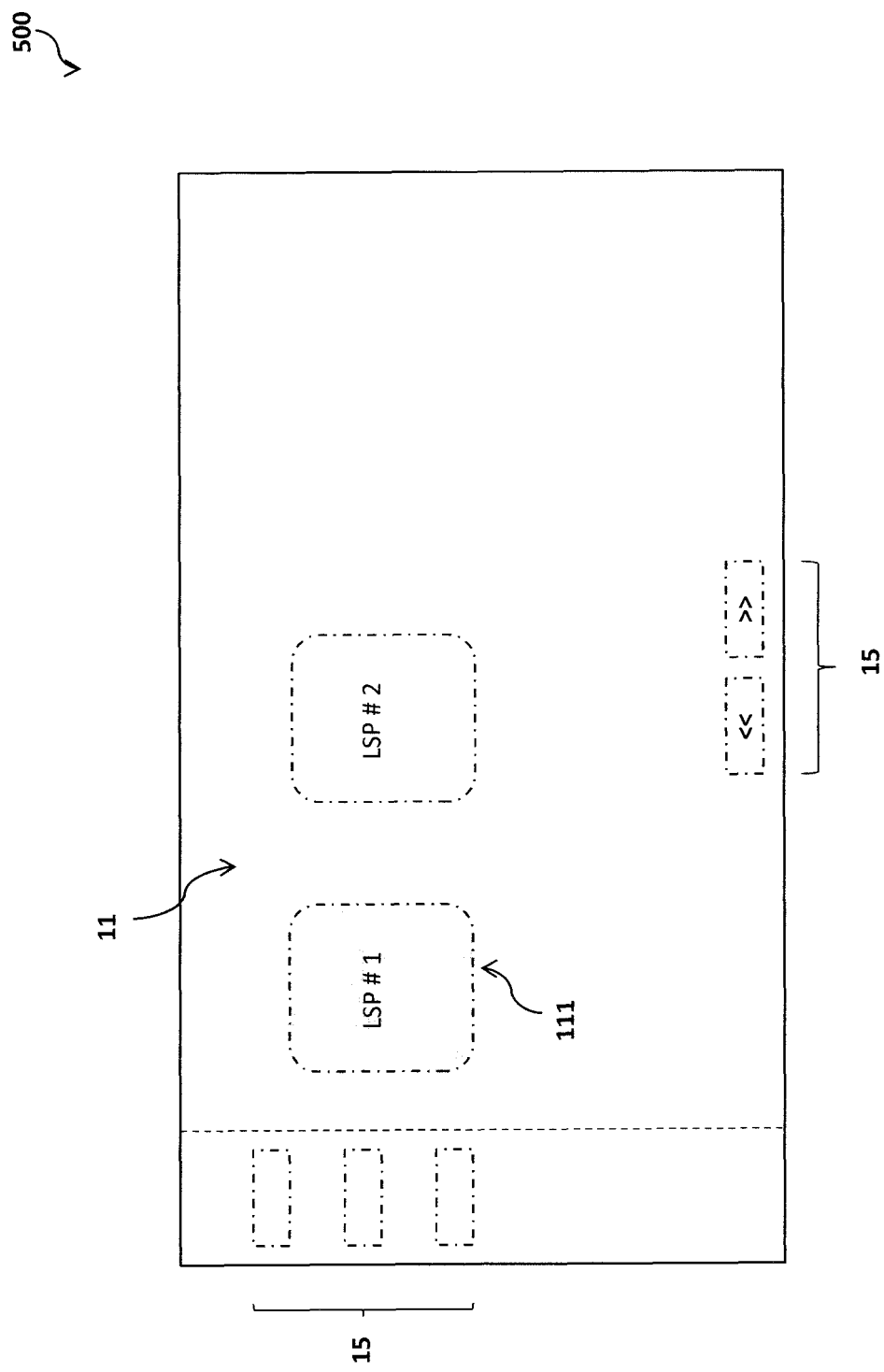
FIGS. 3-9 are schematic views showing the steps of the method, according to the invention.

Preferably, the first graphic resources 11 comprises one or more first graphic objects 111 (e.g. graphic icons) that are automatically uploaded by the computerised device 50 on the GUI 500 to guide a user in selecting an available load shedding procedure LSP to be executed by the load shedding controller 1 (FIG. 3).

By virtue of the activation of the graphic objects 111, the computerised device 50 receives in input configuration data CD to be transmitted to the load shedding controller 1 together with other configuration values CF1, CF2.

Such configuration data will allow the load shedding controller 1 to retrieve a stored set of software instructions corresponding to the selected load shedding procedure LSP to be executed in response to a disconnection of the micro-grid 100 from the main grid 200.

In the schematic example of FIG. 3, a given load shedding procedure is selected by clicking on the corresponding graphic icon LSD #1. Such a load shedding procedure will be executed by the load shedding controller 1.

According to the invention, the method CFP comprises a step of providing second graphic resources 12 on the GUI 500 to assist a user in listing the electric loads $L_1, \ldots, L_N$ included in the micro-grid 100.

Preferably, the second graphic resources 12 comprises second and third graphic objects 121, 122 (e.g. graphic icons) made available on the GUI 500 to define the electric loads $L_1, \ldots, L_N$ of the micro-grid 100 (FIGS. 4-7).

The second graphic objects 121 are automatically uploaded by the computerised device 50 on the GUI 500. These graphic objects can be suitably activated by the user to upload the third graphic objects 122 on the GUI 500. Each graphic object 122 represents an electric load $L_1, \ldots, L_N$ of the micro-grid 100 and it may, in turn, be activated by the user to provide a set of second configuration values CF2 to configure some operating parameters of the load shedding controller 1.

Figure 4:
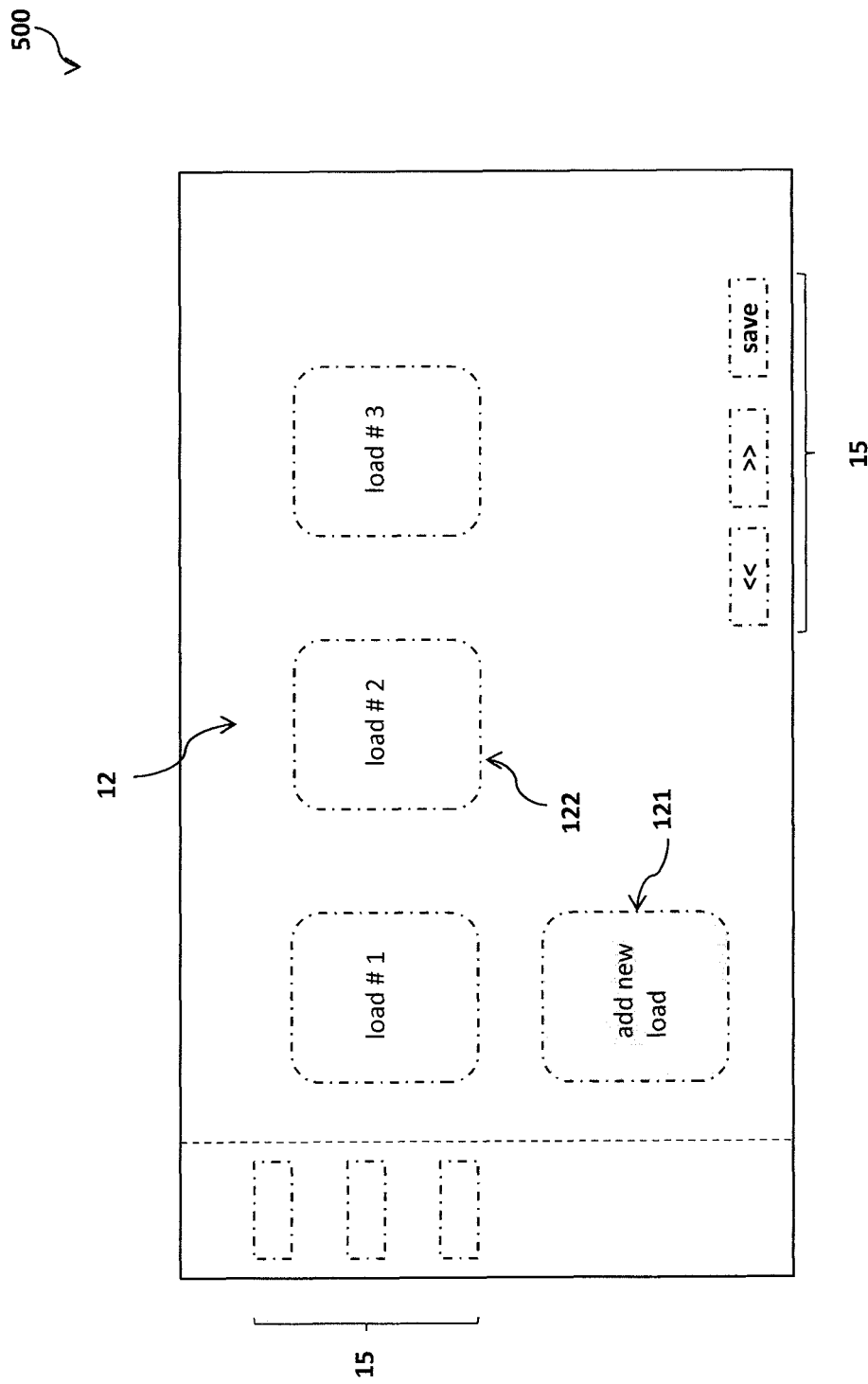

In the schematic example of FIG. 4, the second graphic objects 121 comprise the graphic icon "add new load". By clicking on this graphic icon, the graphic icons "load #1", "load #2" and "load #3" (third graphic objects 122) are uploaded on the GUI 500. Each of said graphic icons represents an electric load of the micro-grid 100. As it will be shown in the following, by clicking on each graphic icon "load #1"-"load #3", additional graphic objects are conveniently uploaded on the GUI 500 to configure operating parameters of the load shedding controller 1, which relate to the operation of the corresponding electric load represented by said graphic icon 122.

Figure 6:
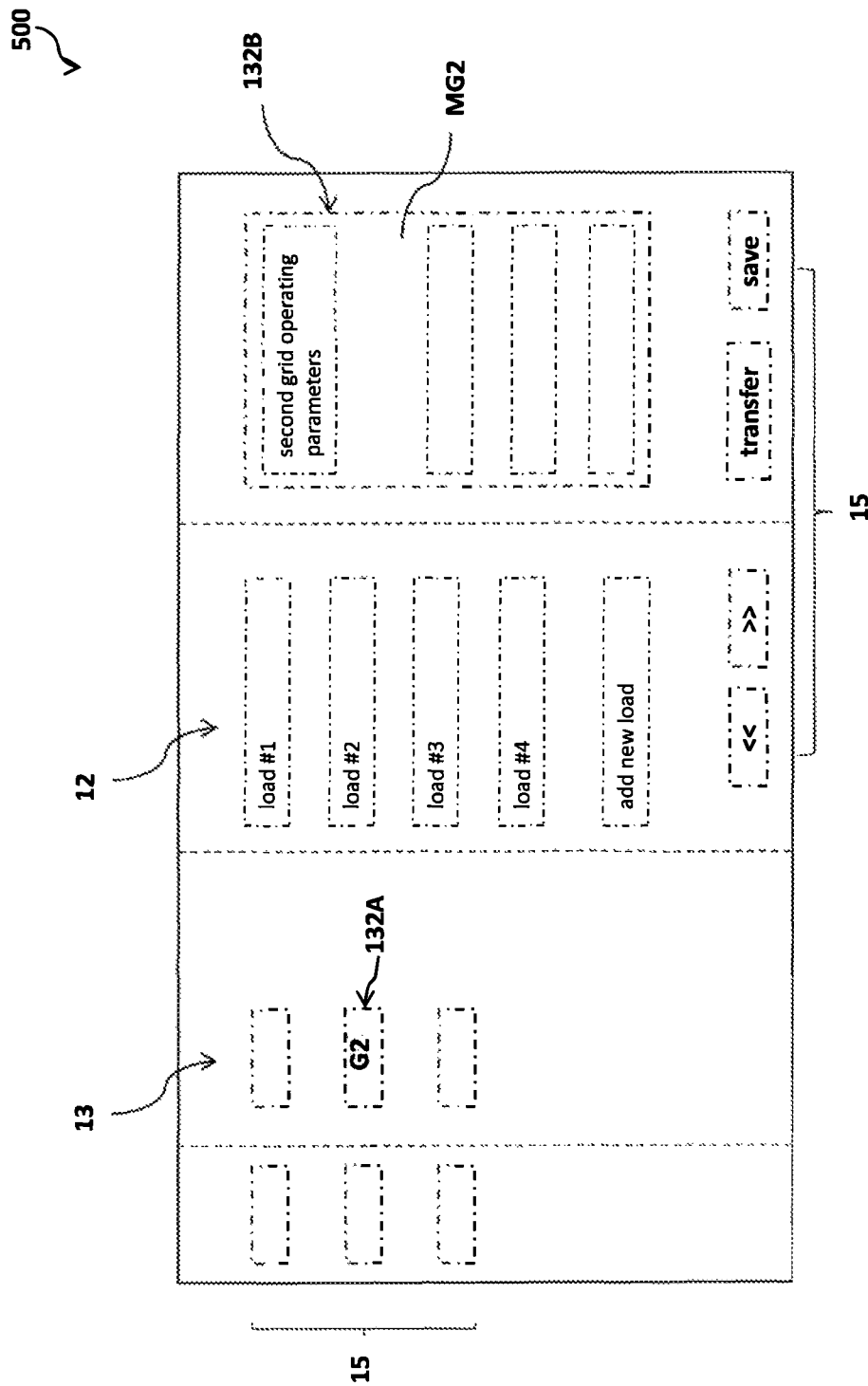
Figure 7:
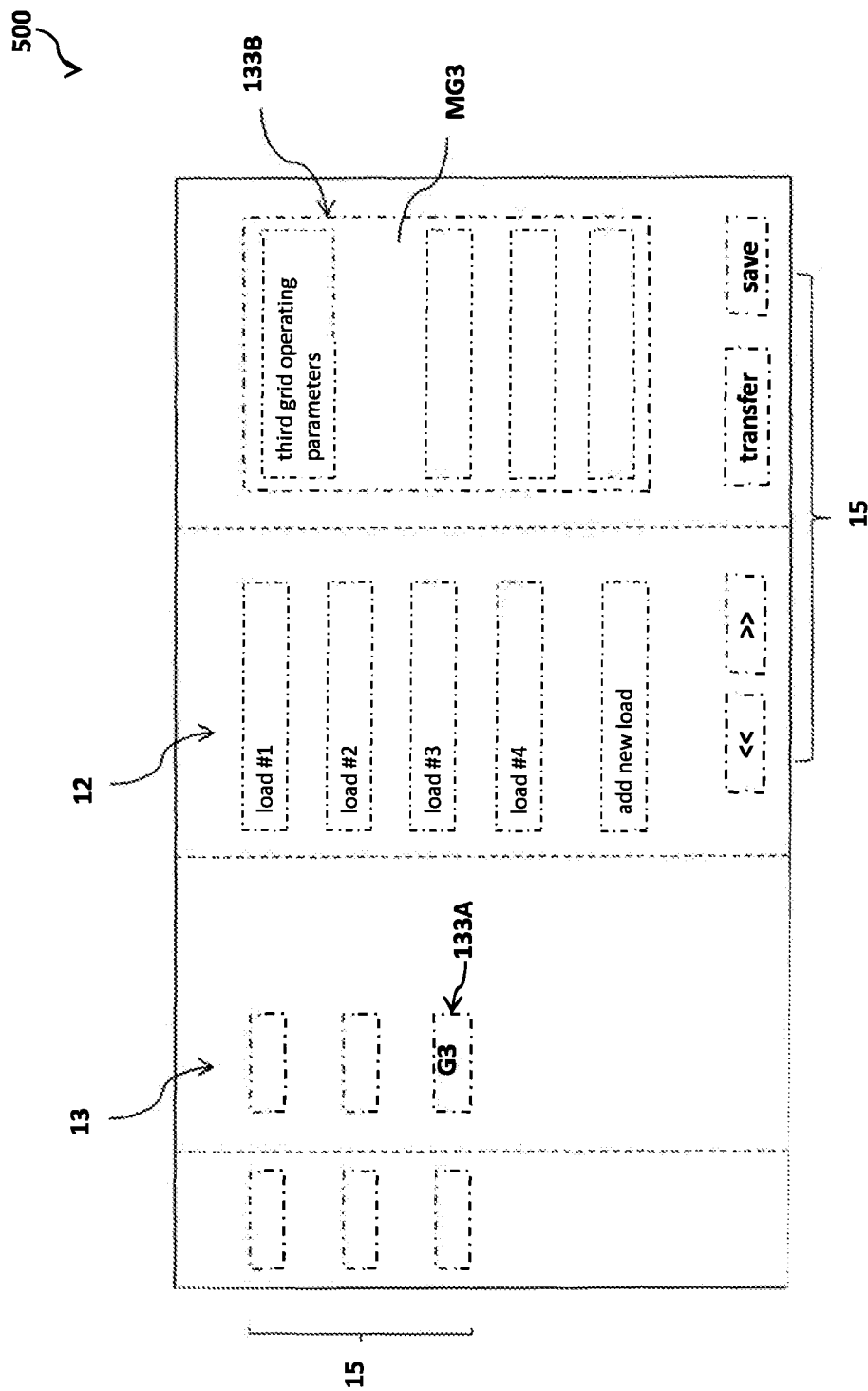

According to the invention, the method CFP comprises a step of providing third graphic resources 13 on the GUI 500 to assist a user in providing first configuration values CF1 to configure grid operating parameters of the load shedding controller 1. Said grid operating parameters are conveniently processed by the load shedding controller 1 to carry out the load shedding procedure LSP previously selected by means of the first graphic resources 11 of the GUI 500 (FIGS. 5-7).

By virtue of the third graphic resources 13, a user can provide in input to the computerised device 50 first configuration values CF1 to configure said grid operating parameters, which, in general, are related to the operation of the micro-grid 100 and, possibly, of some specific electric power generators thereof.

Figure 5:
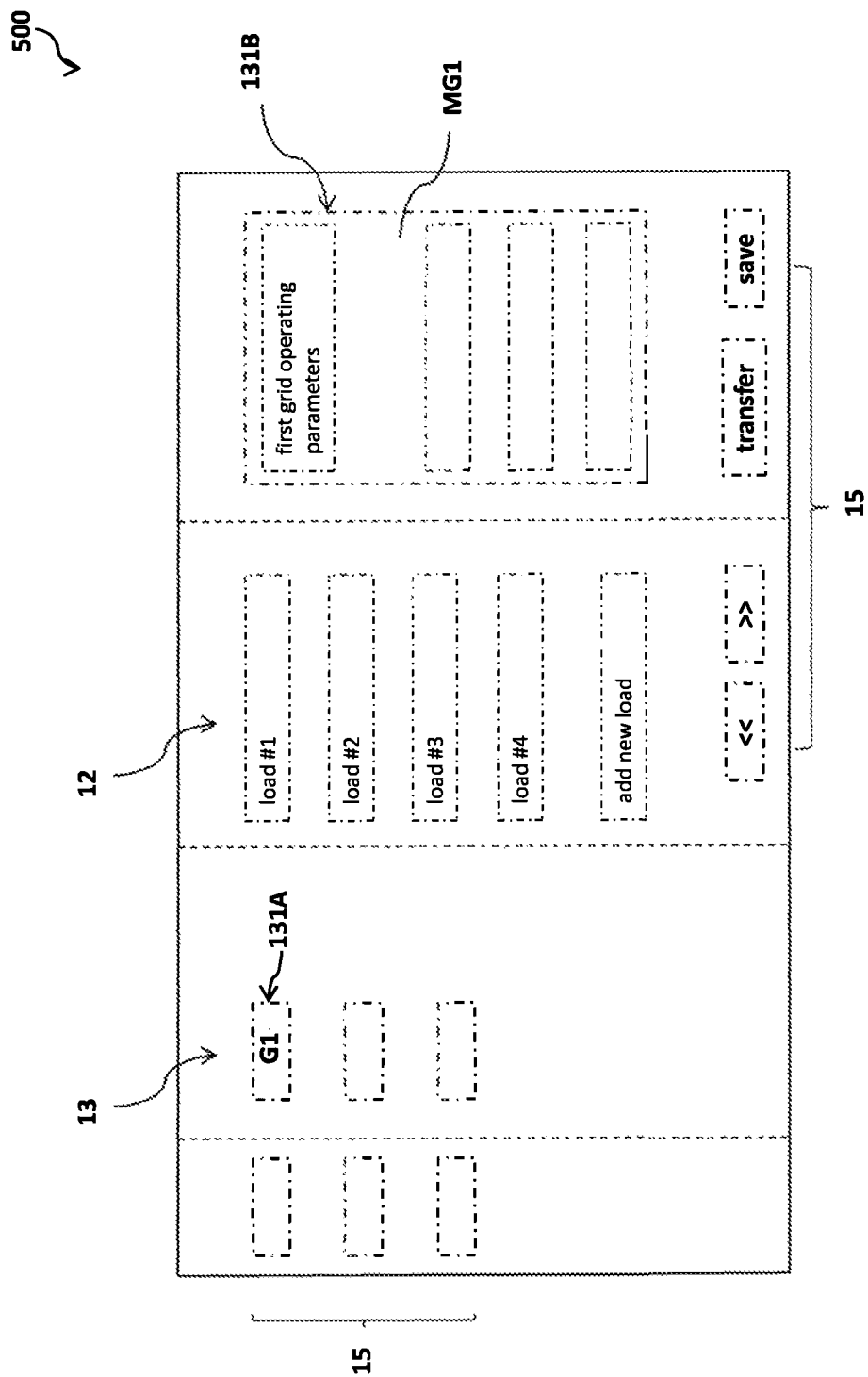

Preferably, the third graphic resources 13 comprises fourth and fifth graphic objects 131A, 131B made available on the GUI 500 to set-up first grid operating parameters included in said grid parameters and related to the general operation of the micro-grid 100 (FIG. 5).

As an example, the first grid operating parameters may include the frequency and the frequency thresholds foreseen for the micro-grid 100, input and output parameters for communication with the switching device S1, and so on.

The fourth graphic objects 131A are automatically provided by the computerised device 50 on the GUI 500 and can be suitably activated by the user to upload the fifth graphic objects 131B on the GUI 500.

Conveniently, the fifth graphic objects 131B include graphic masks and/or graphic cursors and/or graphic menus that can be employed by the user to provide suitable first configuration values CF1 to set-up said first grid operating parameters in input to the computerised device 50.

In the schematic example of FIG. 5, the fourth graphic objects 131A comprise a graphic icon G1 that can be clicked to upload a corresponding menu MG1 (fifth graphic objects 131B) on the GUI 500. A user can type the configuration values CF1 to set-up the above-mentioned first grid operating parameters on the sections of the graphic menu MG1.

Preferably, the third graphic resources 13 comprises sixth and seventh graphic objects 132A, 132B made available on the GUI 500 to set-up second grid operating parameters included in said grid parameters and related to the operation of at least an energy production plant (e.g. a solar plant) of the micro-grid 100 (FIG. 6).

As an example, the second grid operating parameters may comprise one or more geographic data related to the location of said at least an energy production plant.

The eighths graphic objects 133A are automatically provided by the computerised device 50 on the GUI 500 and can be suitably activated by the user to upload the ninth graphic objects 133B on the GUI 500.

Conveniently, the ninth graphic objects 133B include graphic masks and/or graphic cursors and/or graphic menus that can be employed by the user to provide first configuration values CF1 to set-up said third grid operating parameters in input to the computerised device 50.

In the schematic example of FIG. 6, the sixth graphic objects 132A comprise a graphic icon G2 that can be clicked to upload a corresponding graphic menu MG2 (seventh graphic objects 132B) on the GUI 500. A user can type the configuration values CF1 to set-up the above-mentioned second grid operating parameters on the sections of the graphic menu MG2.

Of course, the sixth graphic objects 132A will not be activatable if said at least an energy production plant is not included in the micro-grid 100.

Preferably, the third graphic resources 13 comprises eighth and ninth graphic objects 133A, 133B made available on the GUI 500 to set-up third grid operating parameters included in said grid parameters and related to the operation of at least an emergency generator of the micro-grid 100 (FIG. 7).

As an example, said third grid operating parameters may comprise data related to the output power provided by said at least emergency generator.

The sixth graphic objects 133A are automatically provided by the computerised device 50 on the GUI 500 and can be suitably activated by the user to upload the seventh graphic objects 133B on the GUI 500.

Conveniently, the seventh graphic objects 133B include graphic masks and/or graphic cursors and/or graphic menus that can be employed by the user to provide first configuration values CF1 to set-up said third grid operating parameters in input to the computerised device 50.

In the schematic example of FIG. 7, the eighth graphic objects 133A comprise a graphic icon G3 that can be clicked to upload a corresponding graphic menu MG3 (ninth graphic objects 133B) on the GUI 500. A user can type the configuration values CF1 to set-up the above-mentioned third grid operating parameters on the sections of the graphic menu MG3.

Of course, the sixth graphic objects 132A will not be activatable if said at least an electric power generator is not included in the micro-grid 100.

Figure 8:
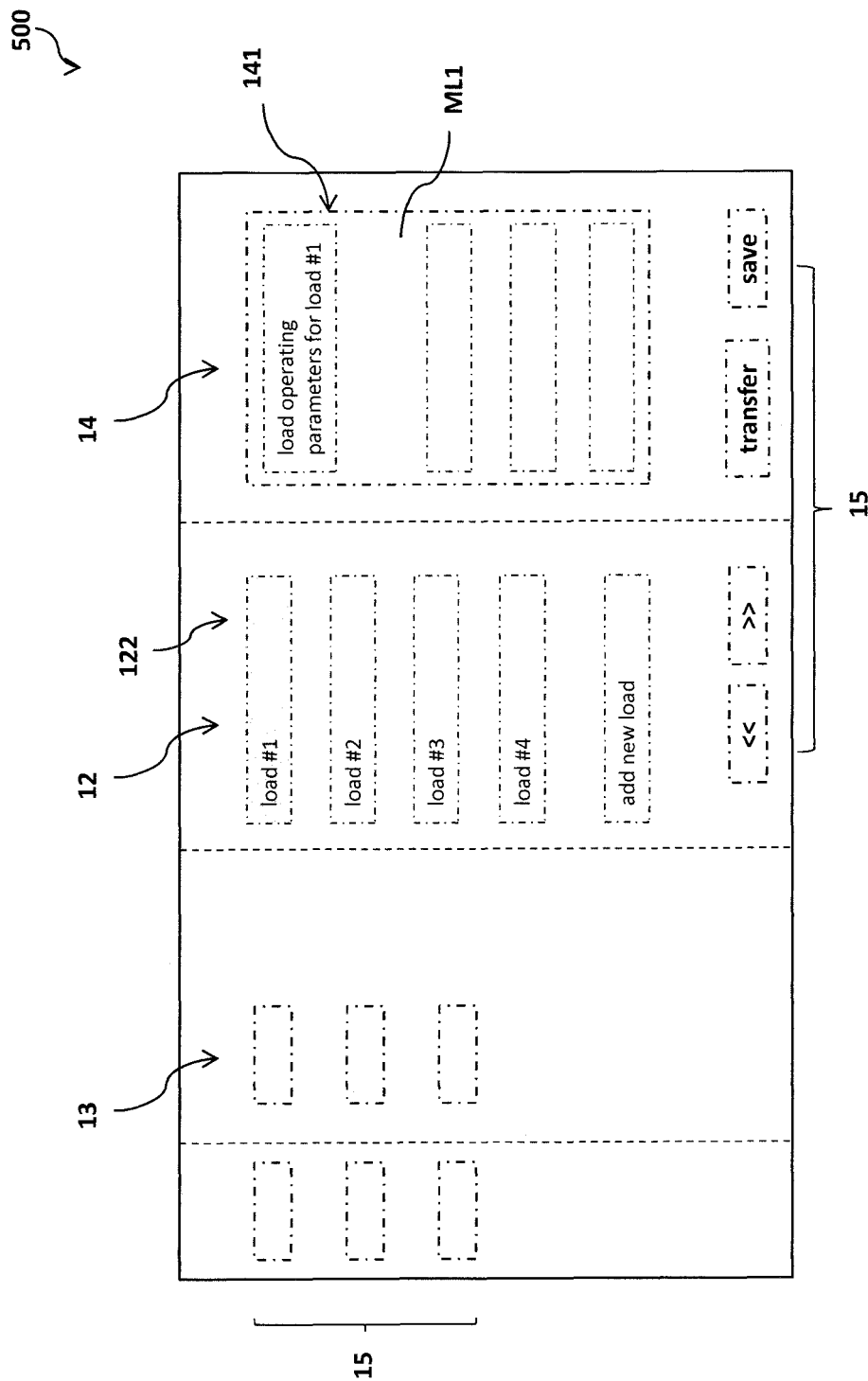
Figure 9:
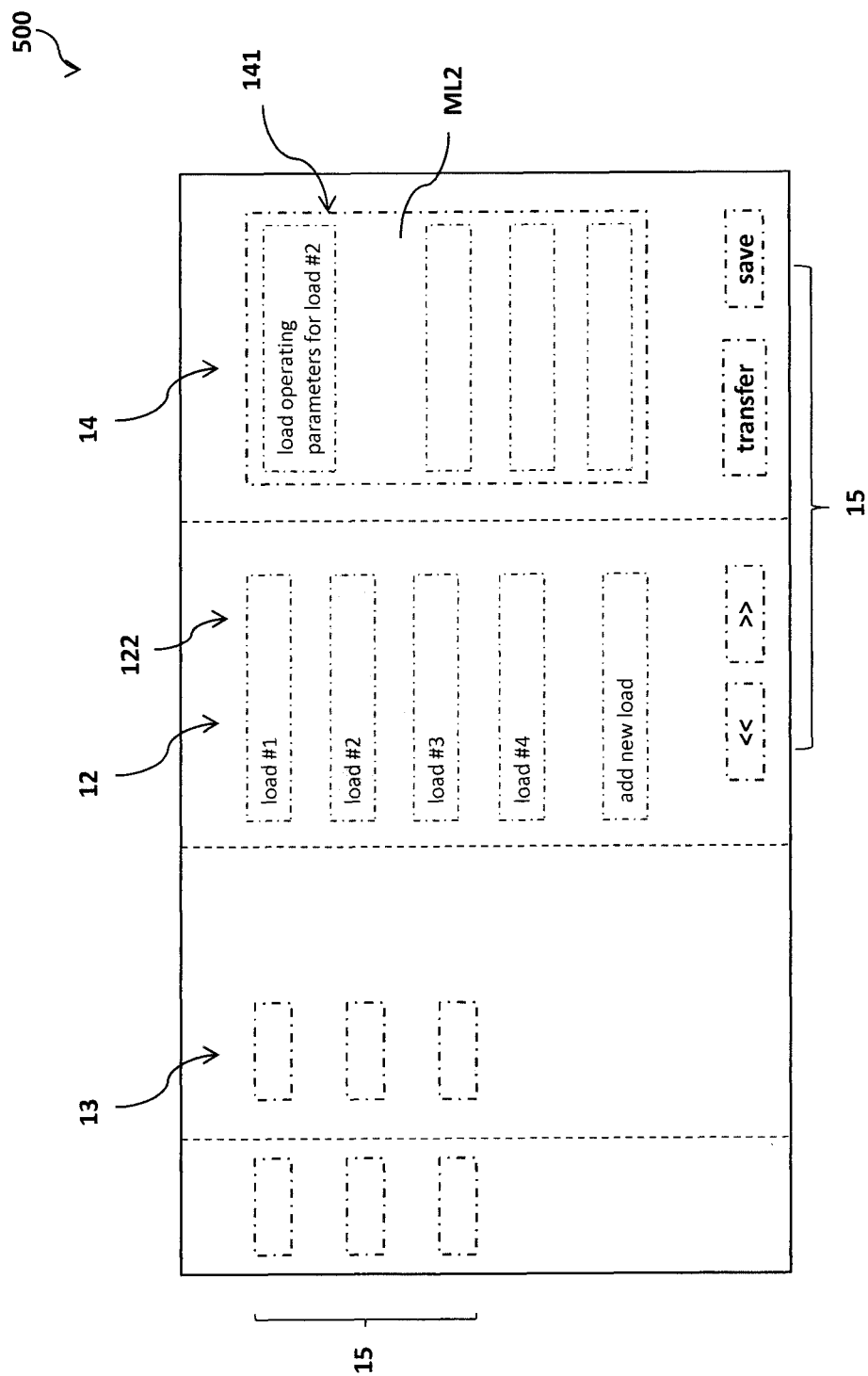

According to the invention, the method CFP comprises a step of providing fourth graphic resources 14 on the GUI 500 to assist a user in providing second configuration values CF2 to configure load operating parameters of the load shedding controller 1. Said load operating parameters are conveniently processed by the load shedding controller 1 to carry out the load shedding procedure LSP previously selected by means of the first graphic resources 11 of the GUI 500 (FIGS. 8-9). By virtue of the fourth graphic resources 14, a user can provide second configuration values CF1 in input to the computerised device 50 to configure said load operating parameters, which, in general, are related to the operation of the electric loads $L_1, \ldots, L_N$ of the micro-grid 100.

As an example, said first load operating parameters may comprise data related to the priority of said electric load, the connection or disconnection of said electric load, the estimated consumed power of said electric load, input and output parameters for communication with a switching device $S_2$ operatively associated with said electric load, and so on.

Preferably, the fourth graphic resources 14 comprise tenth graphic objects 141 to set-up said load operating parameters for each electric load $L_1, \ldots, L_N$.

Preferably, the computerised device 50 uploads the tenth graphic objects 141 on the GUI 500 in response to the activation of the third graphic object 122 identifying the corresponding electric loads $L_1, \ldots, L_N$.

Conveniently, the tenth graphic objects 141 include graphic masks and/or graphic cursors and/or graphic menus that can be employed by the user to provide in input to the computerised device 50 second configuration values CF2 to set-up said load operating parameters.

In the schematic example of FIG. 8, the tenth graphic objects 141 comprise a graphic menu ML1 that is uploaded on the GUI 500 by clicking on a graphic icon load #1 (third graphic objects 122) identifying a corresponding electric load of the micro-grid 100. A user can type the configuration values CF2 to set-up the above-mentioned load operating parameters related to such an electric load on the sections of the graphic menu ML1.

In the schematic example of FIG. 9, the tenth graphic objects 141 comprise a corresponding graphic menu that is uploaded on the GUI 500 by clicking on a graphic icon load #2 (third graphic objects 122) identifying a corresponding electric load of the micro-grid 100. A user can type the configuration values CF2 to set-up the above-mentioned load operating parameters related to such an electric load on the sections of the graphic menu ML2.

Conveniently, a user can save the configuration information provided in input through the GUI 500 on a storage memory of the computerised device 50 by activating a suitable auxiliary graphic resource 15 (e.g. a saving button "save").

According to the invention, before transmitting said configuration information to the load shedding controller, the method 100 comprises a step, in which the computerised device 50 checks whether minimum operating requirements are met by said load shedding controller.

This step is quite advantageous as it ensures a correct transmission of the configuration information to the load shedding controller 1 and, consequently, the prompt operability of the said controller once it has been duly configured.

Preferably, said checking step is automatically carried out, at least partially, by the computerised device 50 upon establishing a communication with the load shedding controller 1 and interrogating the load shedding controller 1.

If the above-mentioned checking step is not successfully completed, an alarm message is provided by the computerised device 50 on the GUI 50.

If the above-mentioned checking step is successfully completed, configuration information can be transmitted to the load shedding controller 1 by activating a suitable auxiliary graphic resource 15 (e.g. a downloading button "transfer").

Accordingly, the method 100 comprises a step, in which the computerised device 50 transmits configuration information, which includes at least the above-mentioned configuration data CD and configuration values CF1, CF2, to the load shedding controller 1.

Upon receiving the configuration data CD and the configuration values CF1, CF2, the load shedding controller 1 can properly set its operating parameters and start operation.

Preferably, said configuration information is transmitted by the computerised device 50 to the load shedding controller 1 via an Internet or a LAN or a WAN communication line.

Preferably, the transmission of said configuration information to the load shedding controller 1 occurs upon the execution of an authentication procedure.

Preferably, such authentication procedure comprises a step, in which the computerised device 50 receives coded information to enable transmission of the above-mentioned configuration information to the load shedding controller 1.

Such coded information may be received from a memory support (e.g. a USB storage device) operatively coupled to an input port (not shown) of the computerised device 50.

As an alternative, such coded information may be received from a remote computer source in communication with the computerised device 50 via the Internet or a LAN or a WAN.

Other solutions are however possible, according to the needs.

Preferably, such authentication procedure comprises a step, in which the computerised device 50 checks said coded information to control whether it is correct.

Preferably, such authentication procedure comprises a step, in which the computerised device 50 transmits said configuration information to the load shedding controller 1, if said coded information is correct.

The method 100, according to the invention, allows fully satisfying the above-mentioned aim and objects.

The method allows a user to carry out the configuration process of the load shedding load shedding controller 1 in an assisted manner with simple steps that can be carried out also by personnel having small experience in modelling electric power distribution networks.

The load shedding controller 1 can thus be configured in a quick and efficient manner with a limited probability of errors.

The method is particularly suitable for implementation by a computerised device capable of communicating with the load shedding controller 1 through the Internet or a LAN or a WAN. This allows avoiding or reducing the need for cabling activities during the configuration process.

The invention claimed is:

1. A method for configuring a load shedding controller (1) adapted to control a micro-grid (100), said micro-grid being electrically connectable with or disconnectable from a main grid (200) and comprising one or more electric loads ($L_1, \ldots, L_N$) and one or more electric power generators ($G_1, \ldots, G_M$), said load shedding controller being capable of executing one or more load shedding procedures (LSP) to electrically connect or disconnect in a selective manner said electric loads ($L_1, \ldots, L_N$) with or from said micro-grid in response to a disconnection of said micro-grid from said main grid, wherein the method comprises the following steps:
   providing a graphic user interface on a computer display, said graphic user interface including graphic resources activatable by a user;
   providing first graphic resources on said graphic user interface to assist a user in selecting a load shedding procedure (LSP) to be executed by said load shedding controller;
   providing second graphic resources on said graphic user interface to assist a user in listing the electric loads ($L_1, \ldots, L_N$) included in said micro-grid;
   providing third graphic resources on said graphic user interface to assist a user in providing first configuration values (CF1) to configure grid operating parameters processed during the execution of the selected load shedding procedure by said load shedding controller;
   providing fourth graphic resources on said graphic user interface to assist a user in providing second configuration values (CF2) to configure load operating parameters processed during the execution of the selected load shedding procedure by said load shedding controller;
   checking whether said load shedding controller meets minimum operating requirements to operate with the first and second configuration values (CF1, CF2) upon establishing a communication with the load shedding controller and interrogating the load shedding controller;
   if said load shedding controller meets said minimum operating requirements, transmitting configuration information including at least said first and second configuration values (CF1, CF2) to said load shedding controller; and
   controlling, with the load shedding controller, the one or more of the electric loads ($L_1, \ldots, L_N$) based on the first and second configuration values (CF1, CF2).

2. The method, according to claim 1, wherein said second graphic resources comprise second and third graphic objects to list the electric loads ($L_1, \ldots, L_N$) of said micro-grid, said second graphic objects being activatable to upload said third graphic objects on said graphic user interface, each of said third graphic object identifying a corresponding electric load of said micro-grid and being activatable to upload further graphic objects configured to assist a user in providing second configuration values (CF2) to set-up said load operating parameters.

3. The method, according to claim 1, wherein said third graphic resources comprise fourth and fifth graphic objects to set-up first grid operating parameters related to operation of said micro-grid, said fourth graphic objects being activatable to upload said fifth graphic objects on said graphic user interface, said fifth graphic objects being configured to assist a user in providing first configuration values (CF1) to set-up said first grid operating parameters.

4. The method, according to claim 1, wherein said third graphic resources comprise sixth and seventh graphic objects to set-up second grid operating parameters related to operation of at least an energy production plant included in said micro-grid, said sixth graphic objects being activatable to upload said seventh graphic objects on said graphic user interface, said seventh graphic objects being configured to assist a user in providing first configuration values (CF1) to set-up said second grid operating parameters.

5. The method, according to claim 1, wherein said third graphic resources comprise eighth and ninth graphic objects to set-up third grid operating parameters related to operation of at least an emergency generator included in said micro-grid, said eighth graphic objects being activatable to upload said ninth graphic objects on said graphic user interface, said ninth graphic objects being configured to assist a user in providing first configuration values (CF1) to set-up said third grid operating parameters.

6. The method, according to claim 1, wherein said fourth graphic resources comprise tenth graphic objects configured to assist a user in providing second configuration values (CF2) to set-up said load operating parameters for each electric load.

7. The method, according to claim 6, wherein said tenth graphic objects are uploaded on said graphic user interface upon activation of said third graphic objects identifying said electric loads.

8. The method, according to claim 1, wherein said step of transmitting said configuration information to load shedding controller comprises the following steps:
   receiving coded information to enable transmission of said configuration information to said load shedding controller;
   checking said coded information;
   transmitting said configuration information to load shedding controller if said coded information is correct.

9. The method, according to claim 1, wherein said configuration information is transmitted to said load shedding controller via an Internet or LAN or WAN communication line.

10. The method, according to claim 2, wherein said third graphic resources comprise fourth and fifth graphic objects o set-up first grid operating parameters related to operation of said micro-grid, said fourth graphic objects being activatable to upload said fifth graphic objects on said graphic user interface, said fifth graphic objects being configured to assist a user in providing first configuration values (CF1) to set-up said first grid operating parameters.

11. The method, according to claim 2, wherein said third graphic resources comprise sixth and seventh graphic objects to set-up second grid operating parameters related to operation of at least an energy production plant included in said micro-grid, said sixth graphic objects being activatable to upload said seventh graphic objects on said graphic user interface, said seventh graphic objects being configured to assist a user in providing first configuration values (CF1) to set-up said second grid operating parameters.

12. The method, according to claim 3, wherein said third graphic resources comprise sixth and seventh graphic objects to set-up second grid operating parameters related to operation of at least an energy production plant included in said micro-grid, said sixth graphic objects being activatable to upload said seventh graphic objects on said graphic user interface, said seventh graphic objects being configured to assist a user in providing first configuration values (CF1) to set-up said second grid operating parameters.

13. The method, according to claim 2, wherein said third graphic resources comprise eighth and ninth graphic objects to set-up third grid operating parameters related to operation of at least an emergency generator included in said micro-grid, said eighth graphic objects being activatable to upload said ninth graphic objects on said graphic user interface, said ninth graphic objects being configured to assist a user in providing first configuration values (CF1) to set-up said third grid operating parameters.

14. The method, according to claim 3, wherein said third graphic resources comprise eighth and ninth graphic objects to set-up third grid operating parameters related to operation of at least an emergency generator included in said micro-grid, said eighth graphic objects being activatable to upload said ninth graphic objects on said graphic user interface, said ninth graphic objects being configured to assist a user in providing first configuration values (CF1) to set-up said third grid operating parameters.

15. The method, according to claim 4, wherein said third graphic resources comprise eighth and ninth graphic objects to set-up third grid operating parameters related to operation of at least an emergency generator included in said micro-grid, said eighth graphic objects being activatable to upload said ninth graphic objects on said graphic user interface, said ninth graphic objects being configured to assist a user in providing first configuration values (CF1) to set-up said third grid operating parameters.

16. The method, according to claim 2, wherein said fourth graphic resources comprise tenth graphic objects configured to assist a user in providing second configuration values (CF2) to set-up said load operating parameters for each electric load.

17. The method, according to claim 3, wherein said fourth graphic resources comprise tenth graphic objects configured to assist a user in providing second configuration values (CF2) to set-up said load operating parameters for each electric load.

18. The method, according to claim 4, wherein said fourth graphic resources comprise tenth graphic objects configured to assist a user in providing second configuration values (CF2) to set-up said load operating parameters for each electric load.

19. The method, according to claim 1, wherein said grid operating parameters include frequency thresholds for the micro-grid.

20. The method, according to claim 1, wherein said load operation parameters include priority of one of the electric loads in the micro-grid; connection or disconnection of one of the electric loads in the micro-grid; estimated consumed power of one of the electric loads in the micro-grid; and input and output parameters for communication with a switching device operatively associated with one of the electric loads in the micro-grid.

21. A computer readable storage medium comprising:
a set of software instructions executable by a processing resource effective to:
provide a graphic user interface on a computer display, said graphic user interface including graphic resources activatable by a user,
provide first graphic resources on said graphic user interface to assist a user in selecting a load shedding procedure to be executed by a load shedding controller,
provide second graphic resources on said graphic user interface to assist a user in listing one or more electric loads included in said micro-grid,
provide third graphic resources on said graphic user interface to assist a user in providing first configuration values to configure grid operating parameters processed during the execution of the selected load shedding procedure by said load shedding controller,
provide fourth graphic resources on said graphic user interface to assist a user in providing second configuration values to configure load operating parameters processed during the execution of the selected load shedding procedure by said load shedding controller,
check whether said load shedding controller meets minimum operating requirements to operate with the first and second configuration values (CF1, CF2) after establishing a communication with the load shedding controller and interrogating the load shedding controller, and
if said load shedding controller meets said minimum operating requirements, transmit configuration information including at least said first and second configuration values to said load shedding controller, the load shedding controller being structured to control the one or more electric loads based on the configuration information.

22. A load controller configuration computerized device comprising:
a memory structured to store a set of instructions; and
a processing resource structured to execute the set of instructions stored on the memory effective to:
provide a graphic user interface on a computer display, said graphic user interface including graphic resources activatable by a user,
provide first graphic resources on said graphic user interface to assist a user in selecting a load shedding procedure to be executed by a load shedding controller,
provide second graphic resources on said graphic user interface to assist a user in listing one or more electric loads included in said micro-grid,
provide third graphic resources on said graphic user interface to assist a user in providing first configuration values to configure grid operating parameters processed during the execution of the selected load shedding procedure by said load shedding controller,
provide fourth graphic resources on said graphic user interface to assist a user in providing second configuration values to configure load operating parameters processed during the execution of the selected load shedding procedure by said load shedding controller, check whether said load shedding controller meets minimum operating requirements to operate with the first and second configuration values (CF1, CF2) in response to establishing a communication with the load shedding controller and interrogating the load shedding controller, and if said load shedding controller meets said minimum operating requirements, transmit configuration information including at least said first and second configuration values to said load shedding controller, the load shedding controller being structured to control the one or more electric loads based on the configuration information.

* * * * *